O. W. BOCHE.
FLYING MACHINE.
APPLICATION FILED JUNE 26, 1911.

1,014,802.

Patented Jan. 16, 1912.
6 SHEETS—SHEET 3.

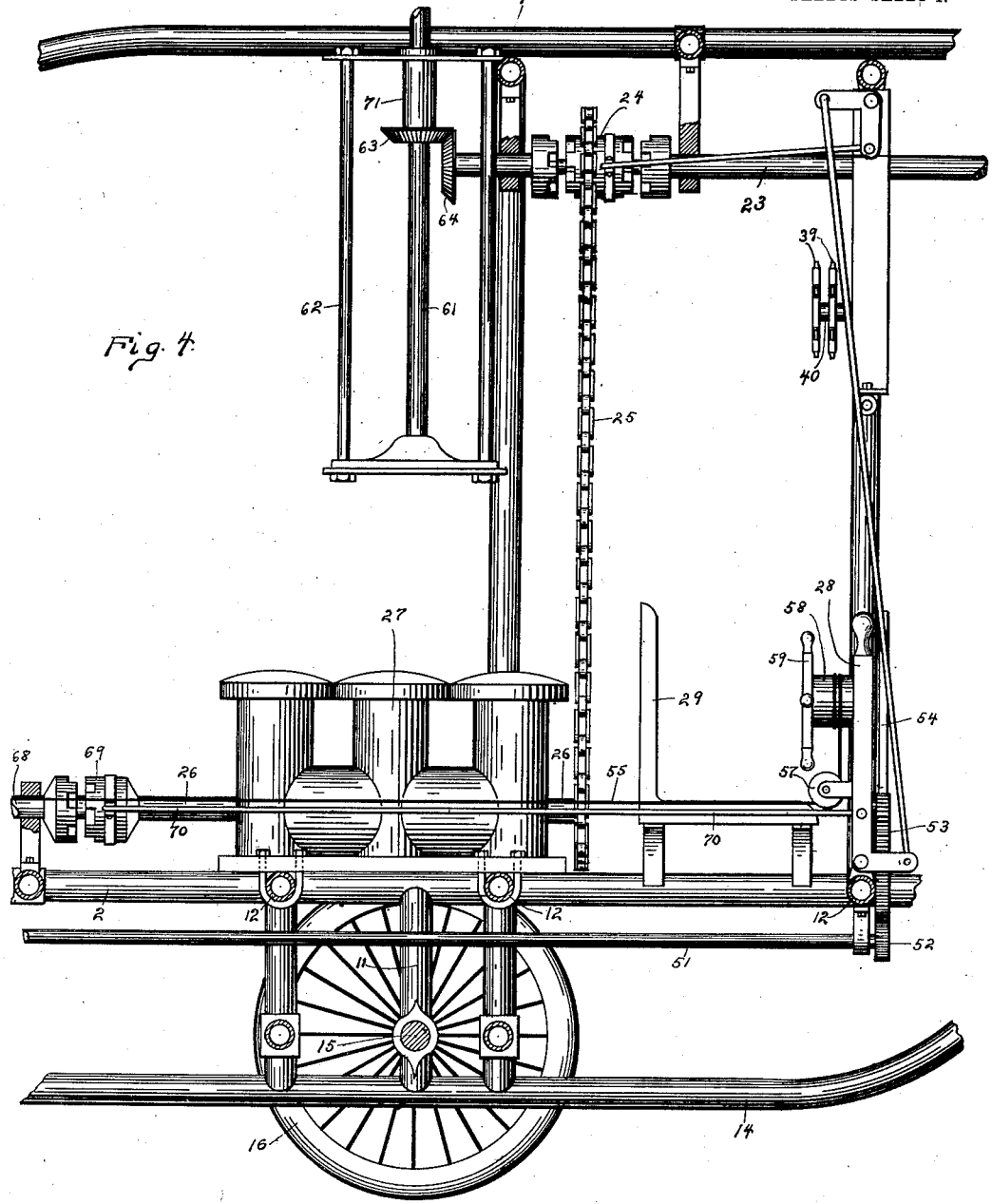

O. W. BOCHE.
FLYING MACHINE.
APPLICATION FILED JUNE 26, 1911.
1,014,802.
Patented Jan. 16, 1912.
6 SHEETS—SHEET 5.
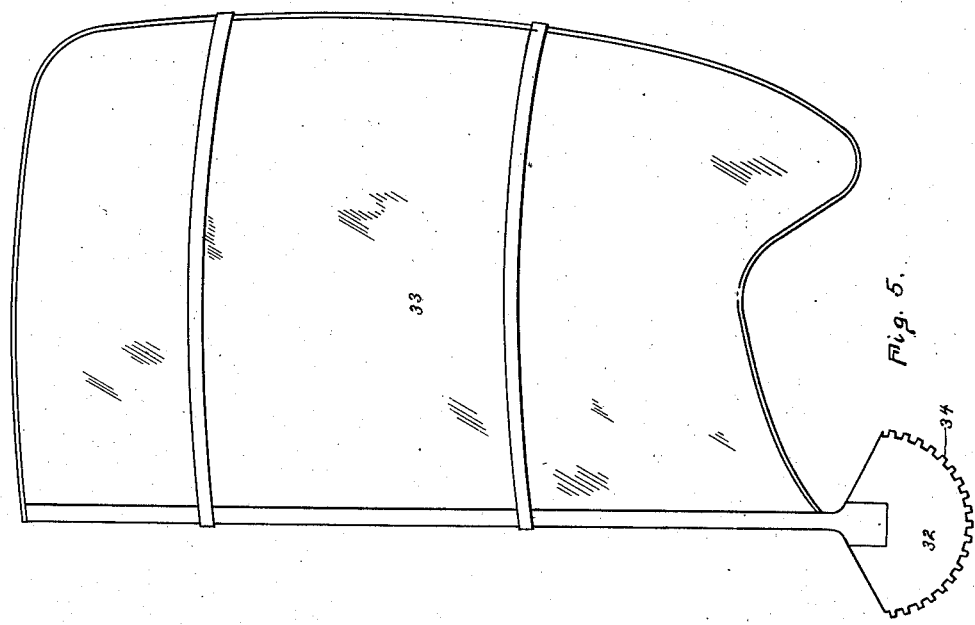
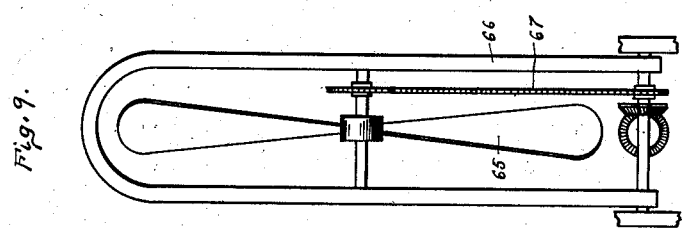
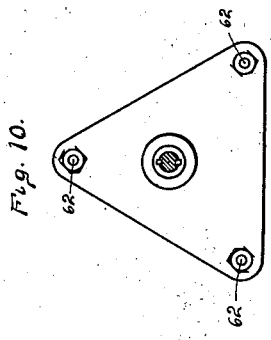
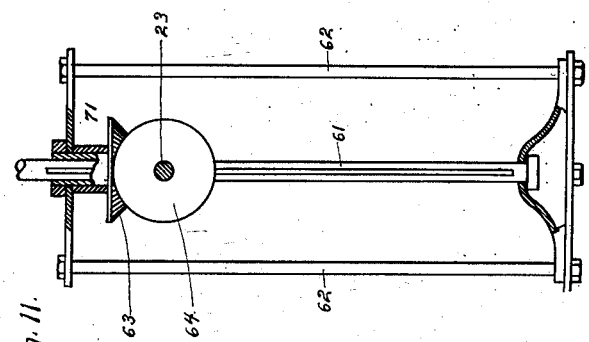

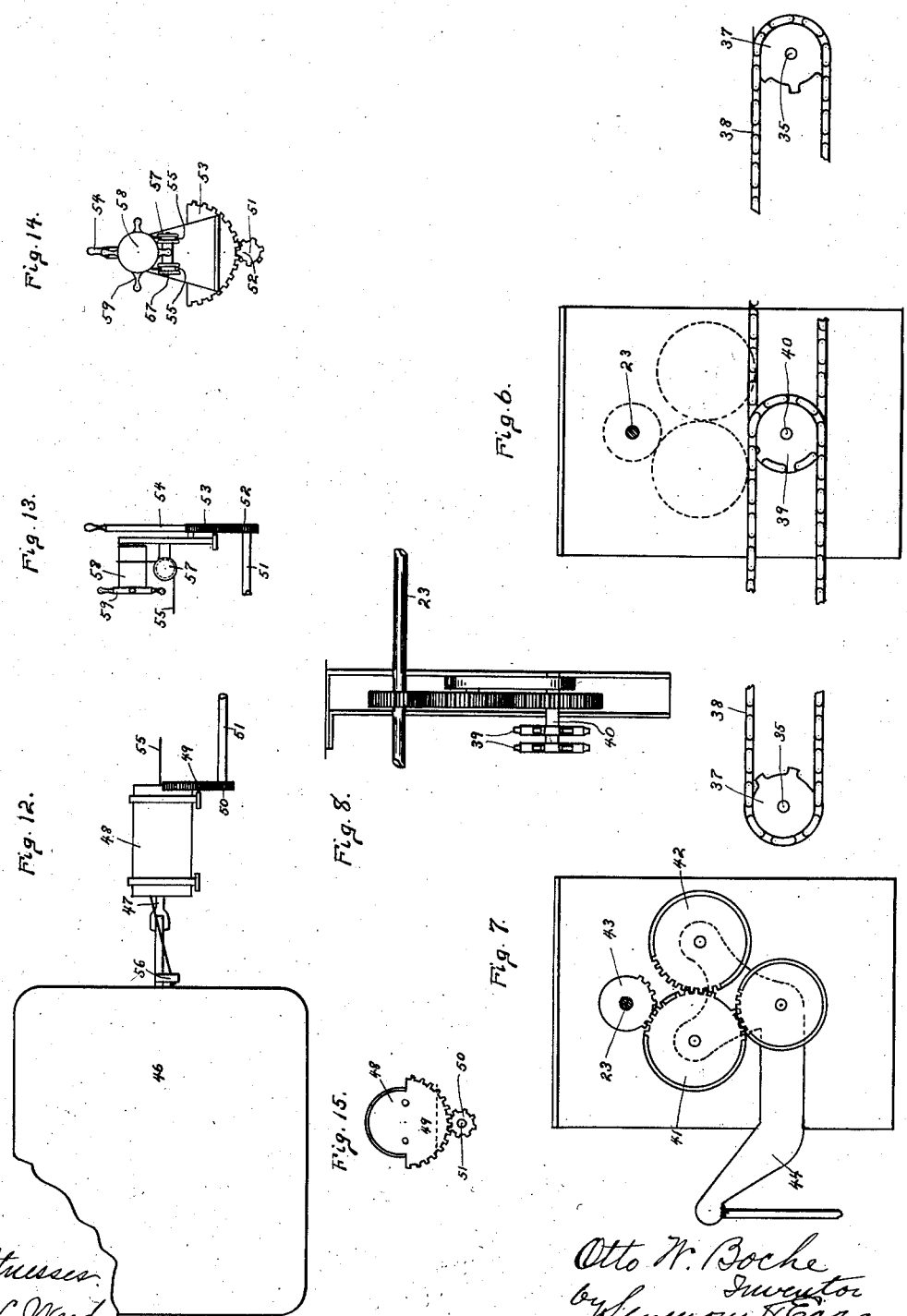

UNITED STATES PATENT OFFICE.

OTTO W. BOCHE, OF MERIDEN, CONNECTICUT.

FLYING-MACHINE.

1,014,802. Specification of Letters Patent. Patented Jan. 16, 1912.

Application filed June 26, 1911. Serial No. 635,270.

*To all whom it may concern:*

Be it known that I, OTTO W. BOCHE, a subject of the Emperor of Germany, residing at Meriden, in the county of New Haven and State of Connecticut, have invented a new and useful Improvement in Flying-Machines; and I do hereby declare the following, when taken in connection with the accompanying drawings and the letters of reference marked thereon, to be a full, clear, and exact description of the same, and which said drawings constitute part of this specification, and represent, in—

Figure 1:
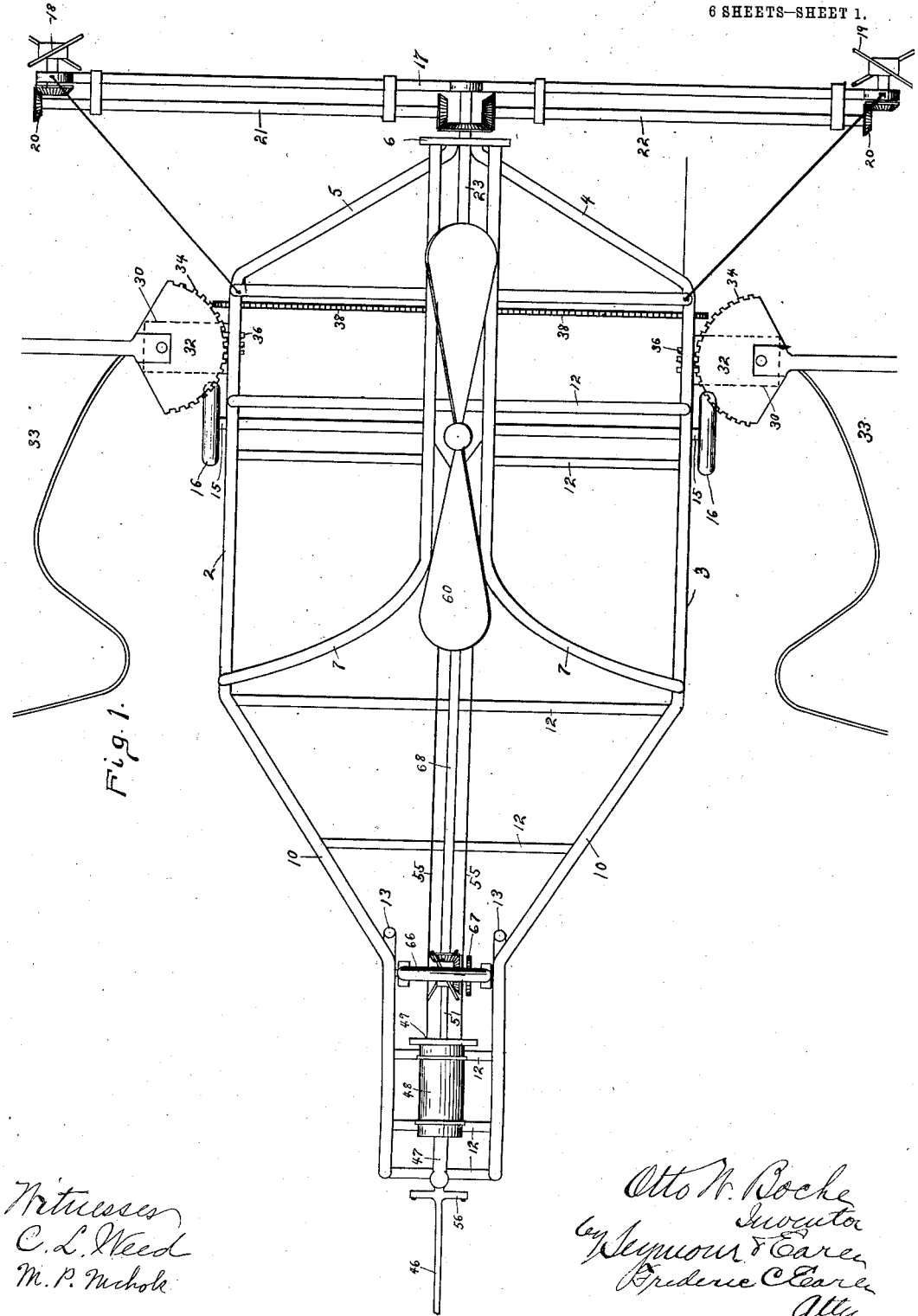
Figure 2:
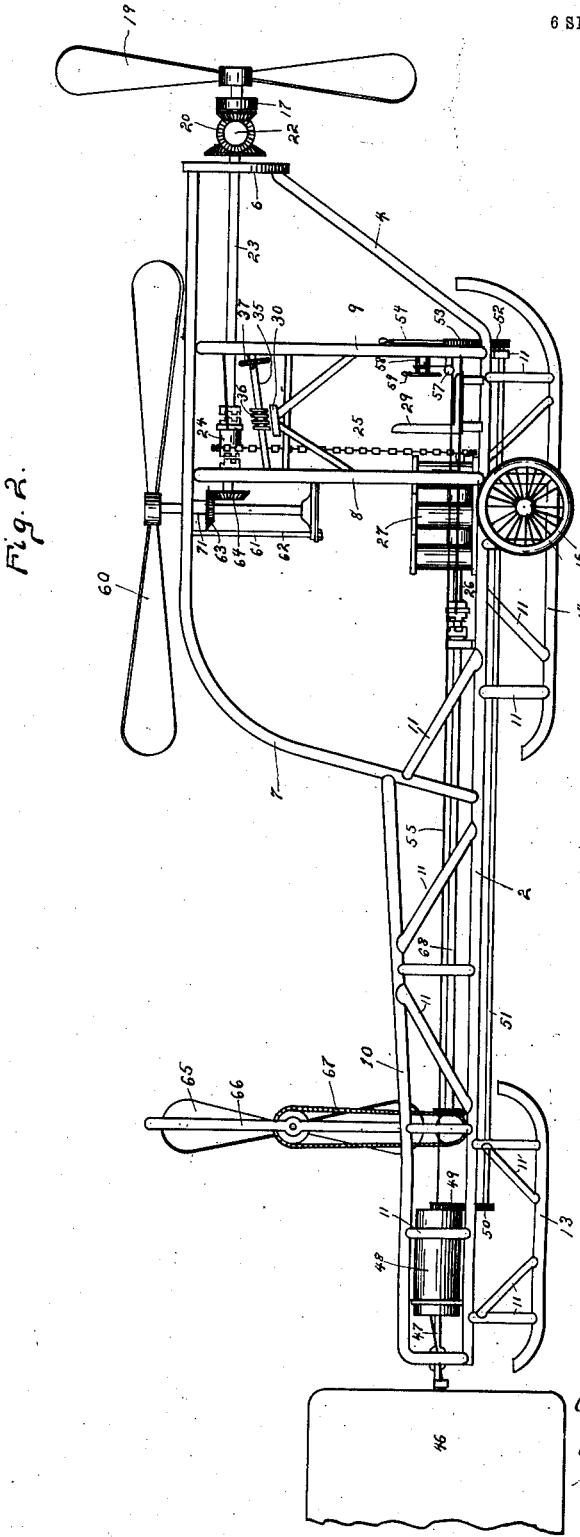
Figure 3:
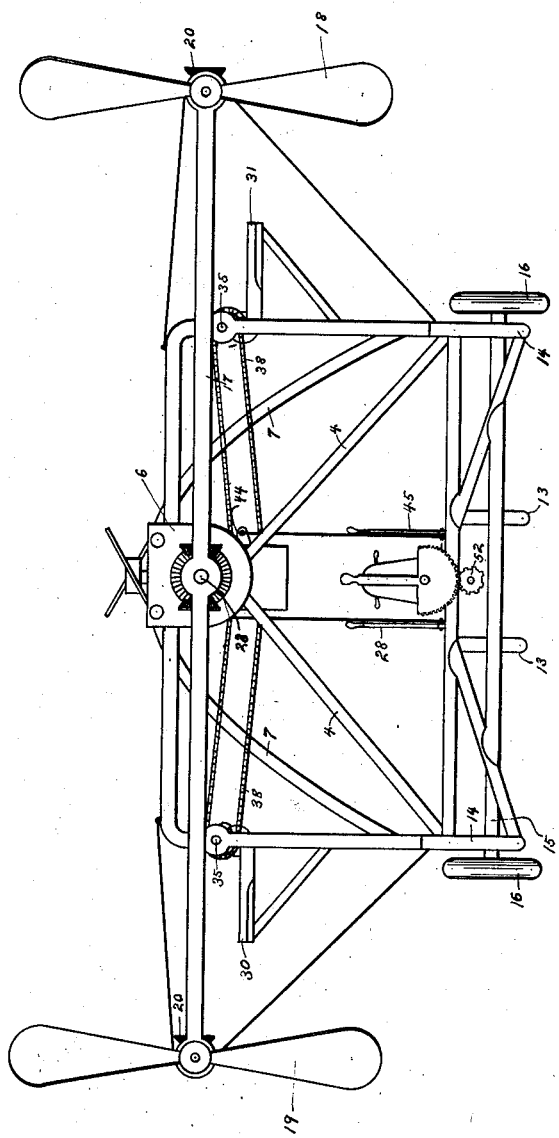

Figure 1 a top or plan view of a machine constructed in accordance with my invention, the wings and the rudder broken away. Fig. 2 a side view with the wing removed. Fig. 3 a front view with the wings broken away. Fig. 4 a side view partially in section on an enlarged scale, illustrating the controlling mechanism. Fig. 5 a plan view of one of the wings, detached. Fig. 6 a diagrammatic view showing means for operating the wings. Fig. 7 a detached view showing means for reversing the movement of the wings. Fig. 8 a side view partially in section of the wing-operating mechanism. Fig. 9 a rear view of the propeller arranged at the rear of the machine to prevent rotation. Fig. 10 a plan view of the supporting mechanism for the descent propeller. Fig. 11 a side view partially in section of the same. Fig. 12 a broken view illustrating the mechanism for operating the rudder. Fig. 13 a side view of the controlling mechanism arranged at the forward end of the machine. Fig. 14 a view of the rudder-controlling mechanism shown in Fig. 13. Fig. 15 an end view of the drum and mechanism for turning the rudder.

This invention relates to an improvement in flying machines, and particularly to motor-driven heavier-than-air machines, the object of the invention being to provide improved means for controlling the vertical and lateral direction of the machine both in starting, flying and landing; and the invention consists in the construction hereinafter described and particularly recited in the claims.

In carrying out my invention I employ a frame formed from tubes of steel, aluminum or other suitable material and comprising two bottom bars 2, 3, the forward ends 4, 5, extending upward and converging to a head 6 to which they are attached, top bars 7 which extend from the sides of the bottom bars 2 upward and forward into the head 6, vertical posts 8 and 9 which extend upward from the bottom bar near the forward end and across beneath the top bar 7 to which they may be attached; also side-frame bars 10 which extend from the rear ends of the bottom bars 2 upward and forward into connection with the top bars 7. These several bars are connected by suitable vertical and angularly arranged stays 11, and the bottom bars are connected by suitable transverse stays 12. Below the rear end of the frame and suitably connected therewith are shoes 13 and near the forward end of the frame are similar shoes 14, and supported on suitable axles 15 are wheels 16. Supported by the head 6 is a transverse propeller-bar 17 at the outer ends of which propellers 18 and 19 are supported, these propellers being driven in opposite directions through beveled gears 20 on the outer ends of shafts 21, 22, which are driven through a shaft 23 which carries a clutch 24 by which the shaft may be driven through a sprocket chain 25 from the driving shaft 26 of any suitable motor mechanism 27, the clutch mechanism being controlled by the aviator through a lever 28 arranged in front of the aviator's seat 29. Secured to opposite sides of the frame are platforms 30 and 31 upon which are pivotally mounted segments 32 which carry wings 33. These wings are made up of frames preferably covered with a sheet of aluminum and properly braced. The segments 32 have teeth 34, and mounted in the frame are shafts 35 carrying worm gears 36 which mesh with the teeth on the segmental racks, and so that the wings may be turned rearward and downward over the rear portion of the frame, or be turned outward on opposite sides of the frame.

As a convenient means for driving the worm gears 36, the shafts 35 will be provided with sprockets 37 which are driven through chains 38 from sprocket wheels 39 mounted on a shaft 40 which is geared with the shaft 23 through idlers 41, 42, either of which may be turned into engagement with a pinion 43 on the shaft 22 by means of a lever 44 which is controlled by an operating lever 45 arranged in front of the aviator.

The device is provided with a rudder 46 pivotally mounted on a shaft 47, and adapted to be turned in either a vertical or horizontal position, and held at either or any intermediate point. The shaft 47 carries a drum 48, and the drum carries a rack 49 which meshes with a pinion 50 at the rear end of a shaft 51 which extends to the forward end of the machine where it is provided with a pinion 52 in mesh with a segmental rack 53 arranged at the lower end of a rudder-controlling lever 54. In this way the rudder may be turned from vertical to horizontal, or vice versa. To turn the rudder to right or left the ends of a rope 55 are attached to opposite ends of a yoke 56 secured to the stem of the rudder. The runs of rope extend through the drum 48 around suitable idlers 57 to the drum 58 which is provided with a steering wheel 59 in front of the aviator, and so that by turning the wheel in one direction or the other the rope will be moved to turn the rudder to right or left.

To facilitate landing, I mount a retarding propeller 60 at the upper end of a shaft 61 and guide it for vertical movement in guides 62. This shaft is keyed in a bushing 71 carrying bevel gears 63 meshing with the bevel gear 64 on the shaft 23 and adapted to be operated through the sprocket chain 25 and the clutch 24 and so that the propeller 60 will revolve, and as it revolves will rise until the shaft 61 reaches the limit of its upward movement. Near the rear of the device is a rear controlling propeller-blade 65 suitably mounted in a frame 66 and adapted to be driven through a sprocket chain 67 from the shaft 68 which may be connected through a clutch 69 with the driving shaft 26, this clutch being connected with the lever 28 by a link 70.

The motor being started, the operator moves the lever 28, moving the clutch 24 forward so as to drive the shaft 23, and hence the propellers 18 and 19 which are driven in opposite directions. If, then, the wings are turned forward, their inclination is such that the apparatus will rise rapidly, and the angle of upward inclination can be controlled by the movement backward or forward of the wings which are under the control of the operator through the lever 45, that is, moving the lever 45 in one direction, throwing the lever 44 upward, throws the idler 41 into mesh with the pinion 43 to turn the wings in one direction; whereas if the lever 44 is turned downward it forces the idler 42 into mesh with the pinion 43, turning the wings in the opposite direction. The rudder is as above described, always under the control of the operator and may be turned in any desired plane and from right to left.

When about to descend, the operator moves the clutch 24 so as to cut out the propellers 18 and 19, and it will be seen that this is done without stopping the motor;
and when the forward propellers are cut out the rearward movement of the clutch 24 drives the bevel gear 64, and this in turn the bevel gears 63, thus turning the shaft 61 and driving the retarding propeller 60 which by revolving will retard the downward movement of the apparatus and cause it to descend very gradually. By raising the retarding propeller 60 the air forced by it will be directed outwardly, or at least not directly onto the top of the machine and consequently will not counteract its function.

In descending, and particularly in descending rapidly, and when the retarding propeller 60 is in operation, the tendency of that propeller would be to turn the machine; and to prevent this, the rear controlling propeller 65 is brought into operation, being raised and revolved at the same time the propeller 60 is operated as the rearward movement of the lever 28 to throw the clutch 24 rearward to drive the propeller 60 will move the link 70 rearward and throw the clutch 69 into engagement with the shaft 68 to raise and drive the propeller 65.

It will thus be seen that the machine is under perfect control of the operator as the several propellers can be started or stopped at will, and the wings moved forward or rearward as may be required. If moved forward when the machine is being driven by the forward propellers, the tendency of the machine will be to rise, and more or less abruptly as the wings are moved forward to a greater or less extent. When the desired height is attained, the wings are moved backward so as to decrease the resistance and allow the machine to move forward at a more rapid rate. When the forward propellers are stopped, if the wings are moved forward, they will tend to maintain a horizontal position and support the machine to greater or less extent.

It will be understood, without illustration, that the operator's seat and the controlling levers may be inclosed in a suitable housing of any light material with the necessary sight openings.

I claim:—

1. A flying machine comprising a frame and a motor carried thereby, two propellers carried at opposite sides of the forward end and a rudder at the rear end, a wing carried at each side of the frame, said wings each having a segmental rack at its inner end, and means connected with the motor for driving the propellers and including gears engaging with the racks on the wings whereby the wings may be moved forward or backward.

2. In a flying machine, the combination with a frame, a motor carried thereby, propellers at the forward end of the frame, a wing on each side of the frame adapted to be turned rearward, a rudder at the rear of the frame, a vertically movable shaft carrying a retarding propeller at its upper end, a frame carrying a rear controlling propeller mounted on the frame near the rear end, connections between the motor for moving the propellers, and wings, and means for controlling the movement of the same including clutch mechanism whereby the retarding propeller may be set in motion when the forward propellers are at rest.

3. A flying machine comprising a frame, a motor carried thereby, shafts at the forward ends of the frame, propellers at the outer ends of the shafts, a wing mounted at each side of the frame, a rudder at the rear, a vertically movable shaft carrying a propeller at its upper end, a propeller mounted near the rear of the frame, connections between the motors and the propellers, and wings, mechanism for controlling such connection including a clutch whereby the forward propellers may be driven without moving the vertical shaft or the vertical shaft driven without moving the forward propellers.

In testimony whereof, I have signed this specification in the presence of two subscribing witnesses.

OTTO W. BOCHE.

Witnesses:
MALCOLM P. NICHOLS,
CLARA L. WEED.